US008676629B2

(12) United States Patent
Chien et al.

(10) Patent No.: US 8,676,629 B2
(45) Date of Patent: Mar. 18, 2014

(54) SYSTEM AND METHODS FOR RETAIL FORECASTING UTILIZING FORECAST MODEL ACCURACY CRITERIA, HOLDOUT SAMPLES AND MARKETING MIX DATA

(75) Inventors: Yung-Hsin Chien, Apex, NC (US); Yongqiao Xiao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1178 days.

(21) Appl. No.: 11/950,020

(22) Filed: Dec. 4, 2007

(65) Prior Publication Data
US 2008/0255924 A1 Oct. 16, 2008

Related U.S. Application Data

(60) Provisional application No. 60/911,720, filed on Apr. 13, 2007.

(51) Int. Cl.
*G06Q 10/00* (2012.01)
(52) U.S. Cl.
USPC ........................................ 705/7.31; 705/7.29
(58) Field of Classification Search
USPC ................................................ 705/7.29, 7.31
See application file for complete search history.

(56) References Cited

U.S. PATENT DOCUMENTS

| | | | | | |
|---|---|---|---|---|---|
| 6,009,407 | A | * | 12/1999 | Garg | 705/10 |
| 6,044,357 | A | * | 3/2000 | Garg | 705/10 |
| 6,078,893 | A | * | 6/2000 | Ouimet et al. | 705/7.31 |
| 6,205,431 | B1 | * | 3/2001 | Willemain et al. | 705/10 |
| 6,611,726 | B1 | * | 8/2003 | Crosswhite | 700/99 |
| 6,876,894 | B1 | * | 4/2005 | Chen et al. | 700/100 |
| 6,954,758 | B1 | * | 10/2005 | O'Flaherty | 707/802 |
| 7,080,026 | B2 | * | 7/2006 | Singh et al. | 705/7.31 |
| 7,251,589 | B1 | * | 7/2007 | Crowe et al. | 702/189 |
| 7,302,410 | B1 | * | 11/2007 | Venkatraman et al. | 705/35 |
| 7,392,157 | B1 | * | 6/2008 | Delurgio et al. | 702/181 |
| 7,584,116 | B2 | * | 9/2009 | Kakouros et al. | 705/7.31 |
| 7,606,684 | B1 | * | 10/2009 | Pierce | 703/2 |
| 7,634,423 | B2 | * | 12/2009 | Brocklebank | 705/7.29 |
| 7,660,705 | B1 | * | 2/2010 | Meek et al. | 703/2 |
| 7,711,734 | B2 | * | 5/2010 | Leonard | 707/736 |
| 7,716,022 | B1 | * | 5/2010 | Park et al. | 703/2 |
| 7,797,182 | B2 | * | 9/2010 | Lindquist et al. | 705/10 |
| 7,798,399 | B2 | * | 9/2010 | Veit | 235/383 |
| 7,904,327 | B2 | * | 3/2011 | Phelan et al. | 705/7.29 |
| 7,933,762 | B2 | * | 4/2011 | Pinto et al. | 703/22 |
| 8,010,404 | B1 | * | 8/2011 | Wu et al. | 705/7.29 |
| 2003/0144897 | A1 | * | 7/2003 | Burruss et al. | 705/10 |
| 2003/0200134 | A1 | * | 10/2003 | Leonard et al. | 705/10 |
| 2004/0088211 | A1 | * | 5/2004 | Kakouros et al. | 705/10 |
| 2004/0093296 | A1 | * | 5/2004 | Phelan et al. | 705/36 |
| 2004/0103018 | A1 | * | 5/2004 | Kim et al. | 705/10 |
| 2005/0055275 | A1 | * | 3/2005 | Newman et al. | 705/14 |
| 2005/0165635 | A1 | * | 7/2005 | Moessner | 705/10 |
| 2006/0117303 | A1 | * | 6/2006 | Gizinski | 717/136 |
| 2008/0221949 | A1 | * | 9/2008 | Delurgio et al. | 705/7 |

OTHER PUBLICATIONS

SAS/ETS Users Guide, Version 8 SAS Publishing, vol. 1, 1999.*
Kakouros, Steve, et al., APICS—The Performance Advantage APICS, col. 12, No. 9, Oct. 2002.*
ForecastPRO—Product Brochure Business Forecast SYstems, Inc., ForecastPro.com, 2002.*
Autobox 5.0 for Windows—User's Guide & Reference Guide Automatic Forecastign Systems Inc., Dec. 1999.*
SAS Forecast Server Product Brochure SAS, 2005.*
Gooiher, Jan G. et al., 25 Years of Time Series Forecasting Jan. 6, 2006.*
Leonard, Michael, Large scale forecasting with inputs and calendar events (powerpoint slides) ISF2004, International Symposium on Forecasting 2004.*
Leonard, Michael, Large-Scale Forecasting: Millions of Forecasts (conference paper) ISF2004, International Symposium on Forecasting, 2004.*
SAS.com Web Pages—SAS High Performance Forecasting SAS, Jun. 3, 2004, Retrieved from Archive.org Jul. 7, 2011.*
Large Scale Automatic Forecasting using inputs and calendars events—SAS9 SAS, Whitepaper, 2005.*
SAS High-Performance Forecasting 2.2—Users Guide vol. 1 SAS Publishing, Aug. 2006.*
Leonard, Michael, Large-scale Automatic Forecasting: Millions of Forecasts (powerpoint presentation) ISF2002, International Symposium on Forecasting, Jun. 2002.*
SAS ETS Users Guide—Chapter 26—Choosing the Best Forecasting Method SAS, 1999.*
SAS.com Web Pages—SAS High Performance Forecasting SAS, Apr. 21, 2003, Retrieved from Archive.org Jul. 7, 2011.*
SAS.com Web Pages—SAS High Performance Forecasting SAS, Mar. 1, 2005, Retrieved from Archive.org Jul. 7, 2011.*
McQuaire, Allan DR et al., Regression and Time Series Model Selection Word Scientific Publishing, 1998.*
Leonard, Michael et al., U.S. Appl. No. 60/368,890, filed Mar. 29, 2002.*
Leonard, Michael et al., Promotional Analysis and Forecasting for Demand Planning: A Practical Time Series Approach SAS Institute, Inc., 2000.*
SAS Markdown Optimization SAS Institute, Inc., 2004.*
Trusov, Michael et al., Retailer Promotion Planning: Improving Forecast Accuracy and Interpretability Journal of Interactive Marketing, vol. 20, No. 3-4, Summer/Autumn 2006.*

* cited by examiner

*Primary Examiner* — Scott L Jarrett
(74) *Attorney, Agent, or Firm* — Kilpatrick Townsend & Stockton LLP

(57) ABSTRACT

Computer-implemented systems and methods are provided to perform accuracy analysis with respect to forecasting models, wherein the forecasting models provide predictions based upon a pool of production data. As an example, a forecast accuracy monitoring system is provided to monitor the accuracy of the forecasting models over time based upon the pool of production data. A forecast model construction system builds and rebuilds the forecasting models based upon the pool of production data.

27 Claims, 13 Drawing Sheets

| GEO_HIER_SK | PROD_HIER_SK | DATE_SK | FORECAST | ACTUAL | MAPE | RMSE |
|---|---|---|---|---|---|---|
| 501 | 1063 | 533 | 7.55 | 10 | 24.39 | 2.15 |
| 695 | 1063 | 533 | 1.66 | 13 | 42.19 | 1.69 |
| 703 | 1063 | 533 | 12.89 | 14 | 17.73 | 0.65 |
| 766 | 1063 | 533 | 8.89 | 16 | 41.88 | 1.98 |

Fig. 10

SYSTEM AND METHODS FOR RETAIL FORECASTING UTILIZING FORECAST MODEL ACCURACY CRITERIA, HOLDOUT SAMPLES AND MARKETING MIX DATA

CROSS-REFERENCE TO RELATED APPLICATION

This application claims priority to and the benefit of U.S. Application Ser. No. 60/911,720 (entitled Computer-Implemented Forecast Accuracy Systems And Methods and filed on Apr. 13, 2007), of which the entire disclosure (including any and all figures) is incorporated herein by reference.

TECHNICAL FIELD

This document relates generally to computer-implemented forecasting systems and methods, and more particularly to computer-implemented forecast accuracy systems and methods.

BACKGROUND

A typical forecasting system allows the user to explore the data, build forecasting models and analyze the forecasting accuracy. Forecasting accuracy is essential and needs to be monitored, such as continuously on a weekly basis. If the accuracy falls below a desirable level, the models should be rebuilt. For retail applications, datasets are massive, timely and efficient model building is critical, and reasonable forecast accuracy is essential to meet the business needs.

As illustrated in FIG. 1, forecasting accuracy and model (re)building 34 are traditionally done on a different copy of the database (e.g., data mart 32) than the production system's database (e.g., data mart 42). Typically, the analysis is performed in the user's sand box 30, wherein a sand box is a testing environment that separates or isolates untested code or model (re)building operations and changes from the production environment or repository. This separation is used since the production environment 40 and its programs 44 should remain stable and functional while exploration and monitoring continues in the sandbox environment 30. However, the maintenance of two separate data marts (32 and 42) can be costly in terms of resources, and it can present logistical problems whenever the data marts (32 and 42) must be updated, maintained, etc. These problems are particularly acute for retailers as their data marts are extremely large and the model rebuilding/exploration exercises require a significant investment of both time and space.

SUMMARY

In accordance with the teachings provided herein, systems and methods for operation upon data processing devices are provided to perform accuracy analysis with respect to forecasting models, wherein the forecasting models generate predictions based upon a pool of production data. As an example, a forecast accuracy monitoring system is provided to monitor the accuracy of the forecasting models over time based upon the pool of production data. A forecast model construction system builds and rebuilds the forecasting models based upon the pool of production data.

As another example, a forecast accuracy monitoring system is provided to monitor the accuracy of the forecasting models over time based upon the pool of production data. A forecast model construction system builds and rebuilds the forecasting models based upon the pool of production data. The forecast accuracy monitoring system and the forecast model construction system are configured to operate concurrently. The forecast accuracy monitoring system is configured to provide an indication in response to forecast accuracy of one or more of the forecasting models not satisfying prespecified forecast accuracy criteria. The forecast model construction system is configured to rebuild one or more of the forecast models in response to the provided indication.

BRIEF DESCRIPTION OF THE DRAWINGS

FIG. 10 depicts an example of forecast accuracy results.

DETAILED DESCRIPTION

Figure 1:
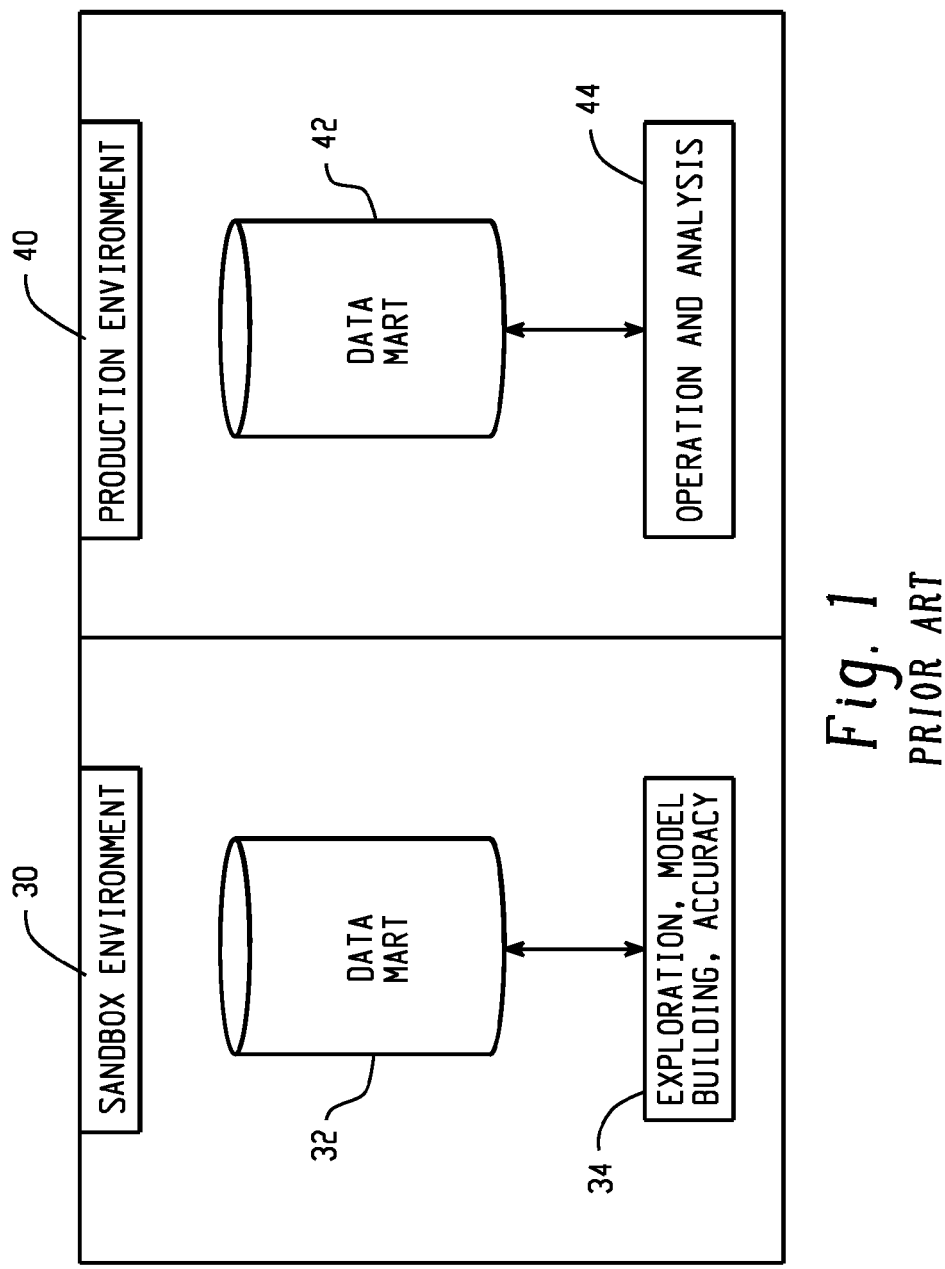
FIG. 1 is a block diagram depicting a traditional way of handling forecasts with respect to production data.
Figure 2:
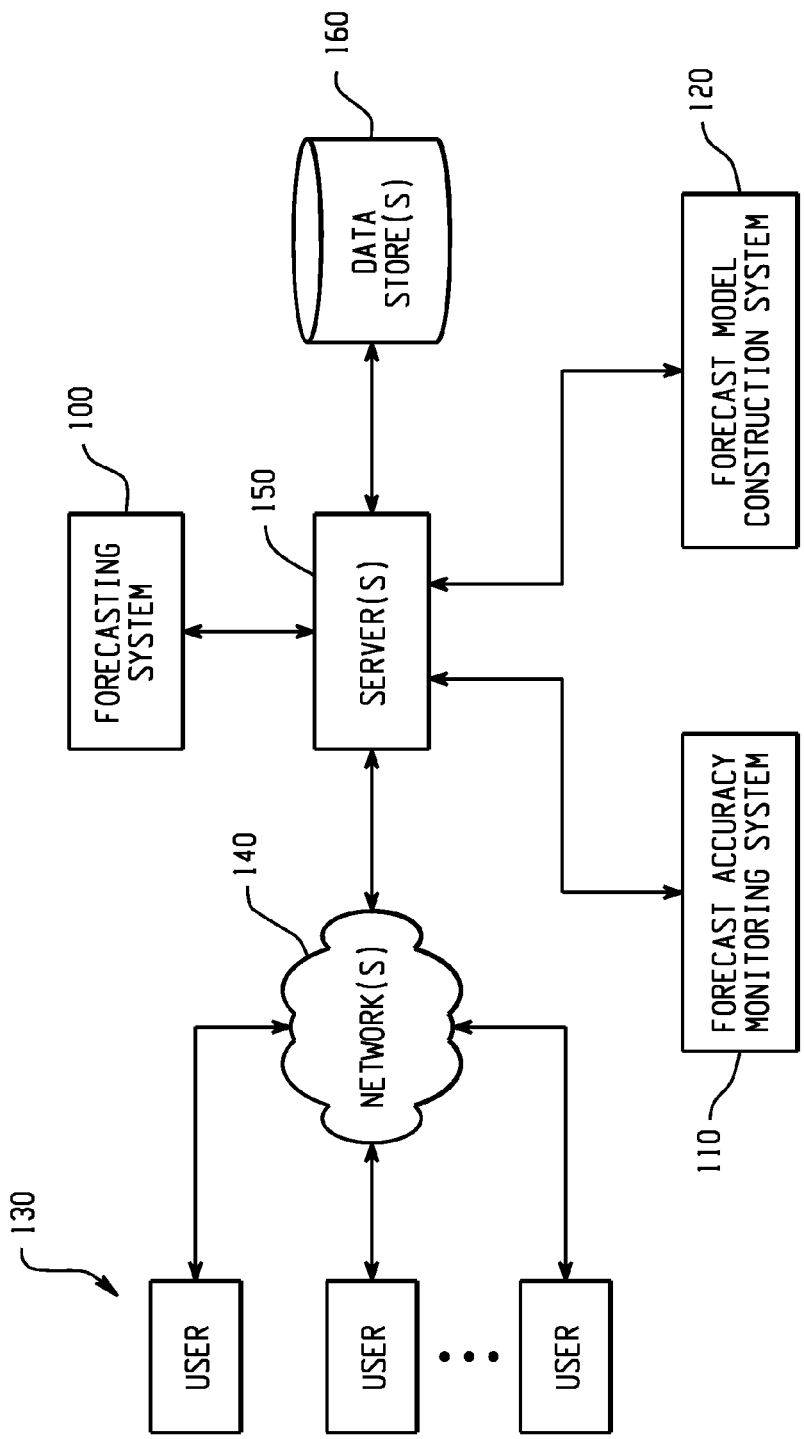
FIG. 2 is a block diagram depicting an environment wherein users can interact with a set of forecasting-related systems (e.g., forecasting-related computer programs or software).

FIG. 2 depicts a forecasting system 100 which generates forecasts for one or a number of different applications and purposes. For example, the forecasting system 100 can generate forecasts or predications based on large amounts of data collected from retail transactional databases, such as Internet websites or point-of-sale (POS) devices. Such data may be analyzed using time series techniques to model marketing mix (e.g. prices and promotions) effects and forecast demand for a vast array of items that the websites or stores may be selling.

The accuracy of the forecasts generated by the forecasting system 100 is monitored by system 110. If the accuracy of forecasts generated by system 100 falls below a desirable level, system 120 creates or rebuilds new models for use by the forecasting system 100 for generation of its forecasts.

Users 130 can interact with systems 100, 110, and 120 through a number of ways, such as over one or more networks 140. Server(s) 150 accessible through the network(s) 140 can host the systems 100, 110, and 120. One or more data stores 160 can store the data to be analyzed by the systems 100, 110, and 120 as well as any intermediate or final data generated by the systems 100, 110, and 120.

The systems 100, 110, and 120 can each be an integrated web-based reporting and analysis tool that provides users flexibility and functionality when forecasts and their models need to be analyzed. It should be understood that the systems 100, 110, and 120 could also be provided on a stand-alone computer for access by a user.

Figure 3:
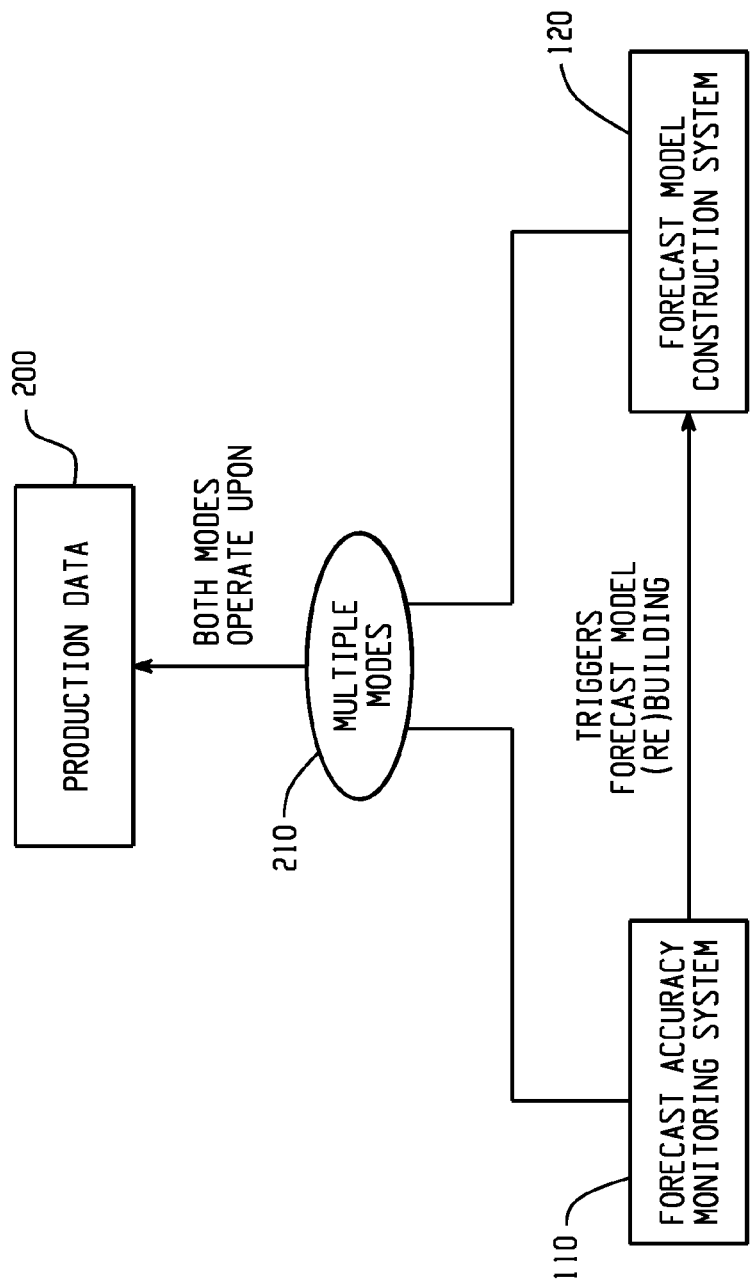
FIGS. 3-5 illustrate forecasting-related systems operating in different modes.

FIG. 3 illustrates that both the forecast accuracy monitoring system 110 and model construction system 120 can access and utilize the production data mart 200 (i.e., the data that exists in the production environment). The user can operate within this environment in one of two modes 210. The first mode is forecast accuracy monitoring as performed by system 110, and the other mode is model (re)building/exploration as performed by system 120. Each mode can be configured to operate concurrently with each other. In other words, each system 110 and 120 can access the production data and perform its respective operations without interfering with the other while accessing and processing the production data 200.

Figure 4:
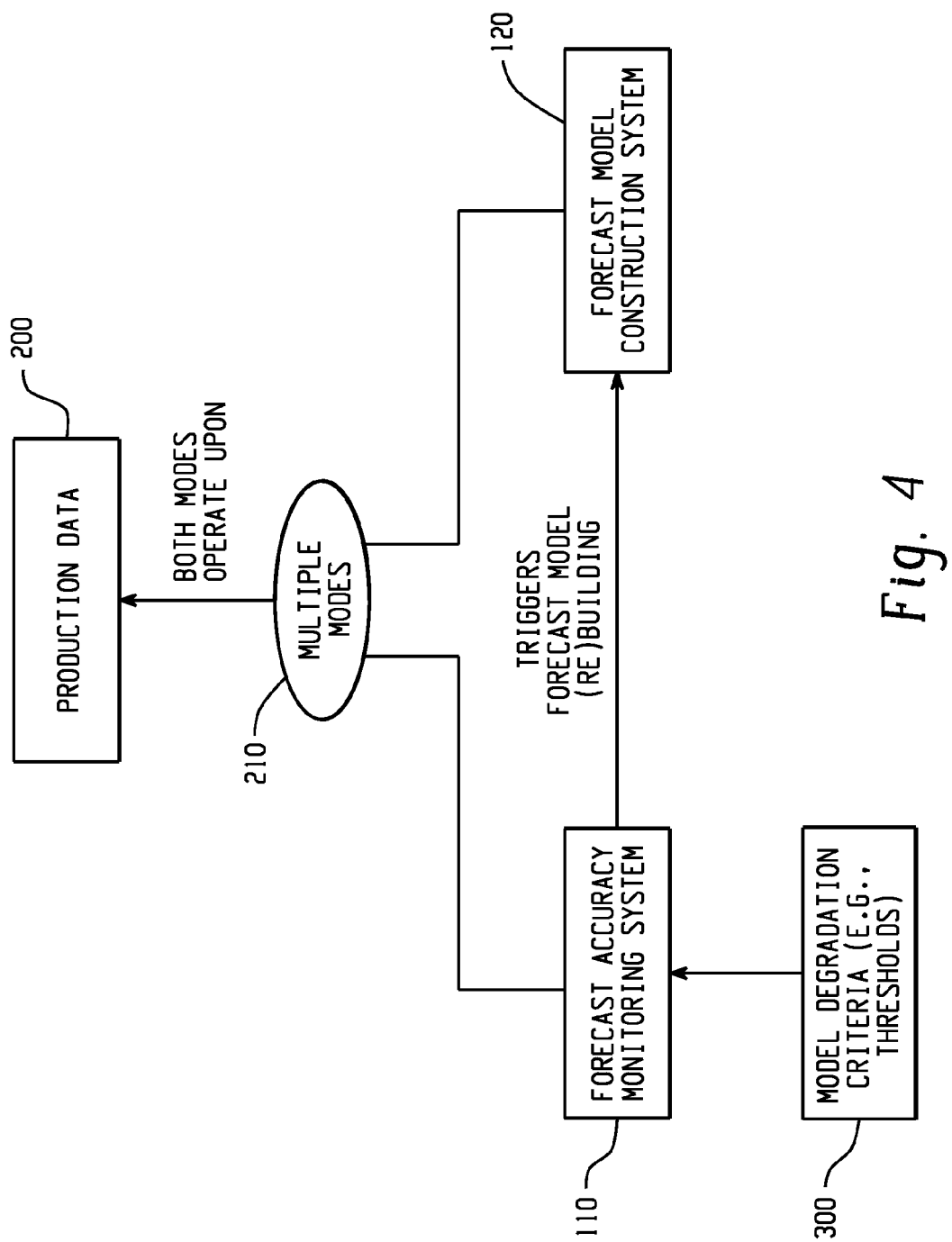

FIG. 4 illustrates that the forecast accuracy monitoring system 110 can be configured to use model degradation criteria 300 (e.g., degradation threshold(s)) in order to determine whether the forecast accuracy has significantly declined. When the model degradation threshold has been reached, the forecast accuracy monitoring system 110 provides an indication that the forecast model construction system 120 needs to build or rebuild models that will provide improved predictive capability. It is noted that with respect to the forecast accuracy monitoring system 110, the production models are assumed to be built already and the forecasting is done with the models and information about future data (e.g., future pricing information).

Figure 5:
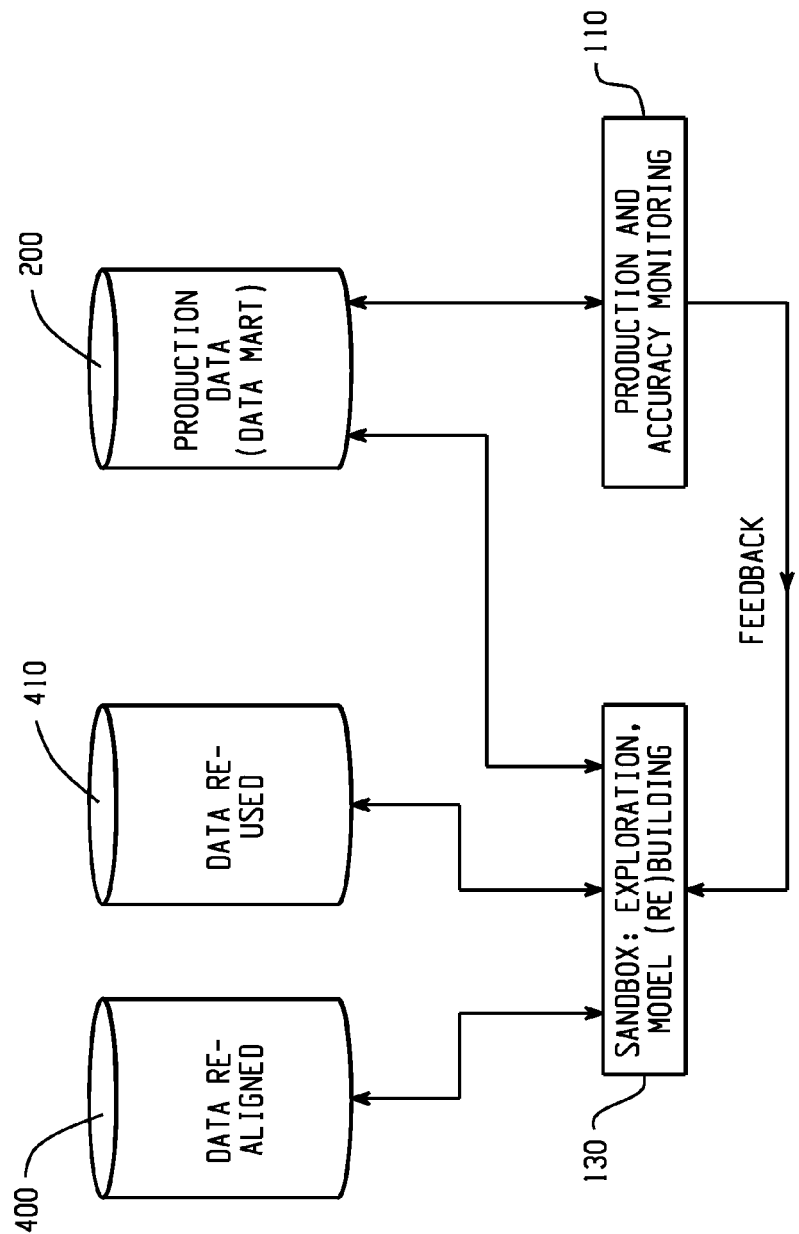
Figure 6:
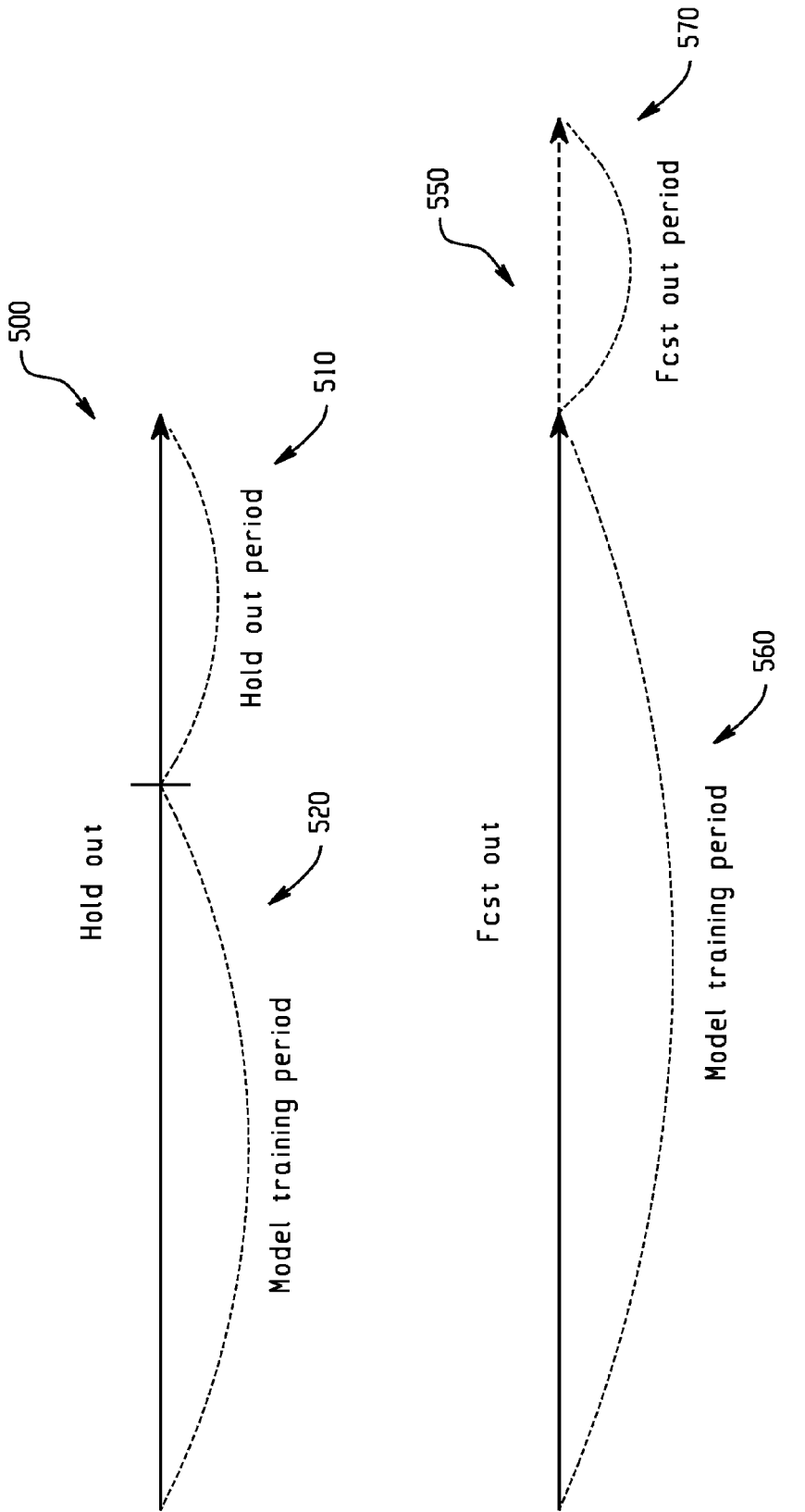
FIG. 6 depicts a hold out technique and a forecast out technique for use in forecast accuracy determinations.

FIG. 5 illustrates that in both modes, the production data 200 is used by either temporarily re-aligning the data 400 where necessary and/or (re)using the data 410 "as is" in the production environment. For example, the systems 110 and 120 can measure and monitor forecast accuracy by re-aligning and using the data as follows:

Hold out method: As shown in FIG. 6 at 500, given some history of data (e.g., two years or more), the most recent history of the data is held out (e.g., hold out period 510), that is, the models are built upon the history before the hold out period as indicated at 520, and the forecast accuracy is calculated with the hold out data.

Forecast out method: the whole history 560 is used to train the models, and some period(s) in the future (i.e., a forecast out period 570) are forecast and measured for forecast accuracy.

Figure 7:
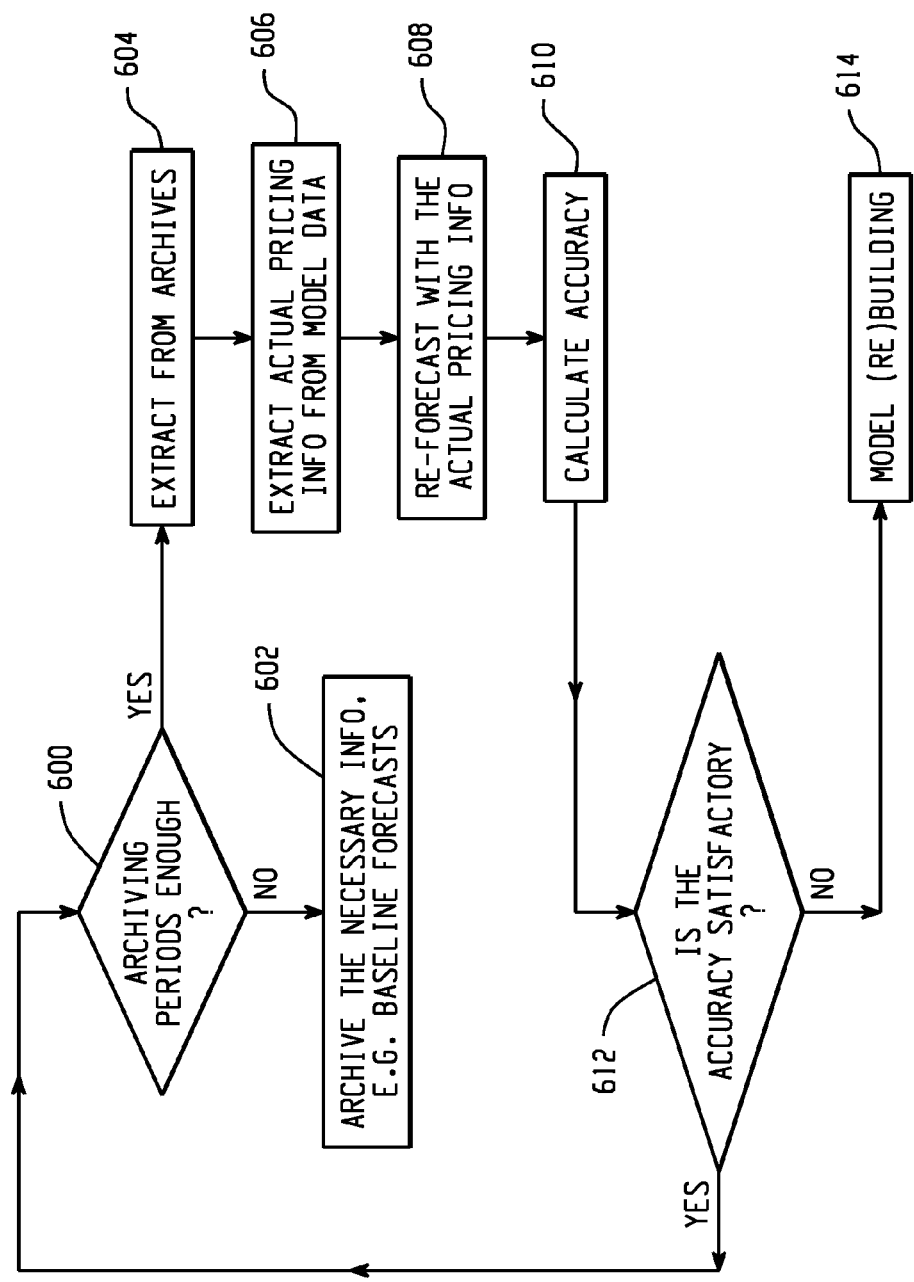
FIG. 7 is a flowchart depicting forecast accuracy monitoring.

FIG. 7 depicts an example operational scenario of accuracy monitoring and its use of the forecast out method for accuracy determinations. The operational scenario also illustrates how certain complications can be addressed when determining whether the models have sufficiently degraded as to warrant rebuilding of a model. Such complications can include that retailers are typically interested in the performance of forecasts over a fixed period of time (e.g., the performance of weekly forecasts over a one month period into the future). Yet, models are often updated, at least partially, week-by-week with the concomitant effect that the forecasts are modified on such a time basis. Further, the planned future marketing mixes used to make the forecasts often differ from the executed marketing mixes for various reasons.

With reference to FIG. 7, the operational scenario begins with decision process 600 determining whether enough periods in the data have been archived. If a sufficient number of periods have not been archived, then process 602 archives the necessary information, such as the baseline forecasts. As an illustration, each time the models are updated and new forecasts are made, the system will archive a user-specified window of forecasts out into the future. For the example given above, this would be four weeks of future forecasts each week the model is updated. In other words, information archiving is performed, which is to archive the base forecasts without the pricing effect, because the future marketing mixes planned may not be the actual marketing mixes executed due to the retail practice. This archiving operation uses the separation of the base forecasts and the marketing mix effect of the models. (When the actual marketing mixes and sales are available, the sales forecasts with the marketing mix effect will be calculated for the accuracy.)

If a sufficient number of periods have been archived as determined by decision process 600, then process 604 extracts the period for analysis from the archives. Process 606 extracts the actual pricing information from the datamart, and process 608 re-forecasts with the actual pricing information. Based upon the new forecasts, the accuracy of the model is calculated by process 610. Decision process 612 examines whether the accuracy is satisfactory (e.g., whether model degradation thresholds have been met). If the accuracy is satisfactory, then model rebuilding is not performed at this time, and processing returns to decision process 600. However if the accuracy is not satisfactory as determined by decision process 612, then process 614 rebuilds the model using information that includes the actual pricing information.

In summary, rather than archiving final sales forecasts, the system will archive what is referred to as a base forecast. This base forecast includes the effect of all factors affecting the final sales forecast except the marketing mix effects. A specified number of weeks (moving window size) can be specified to measure the average accuracy or the total accuracy in the moving window. When actual marketing mixes become available for the forecasted weeks, a final sales forecast is derived using these implemented marketing mixes, and this final forecast is compared to actual sales. The forecast errors over the user specified window length are then monitored using various statistical measures. It is the performance of these forecasts that are typically monitored as they provide an indication of the health of the forecasting system. As an illustration, when the actual sales for the next week are available, the forecasts are then compared to the actual sales to get the accuracy.

Figure 8:
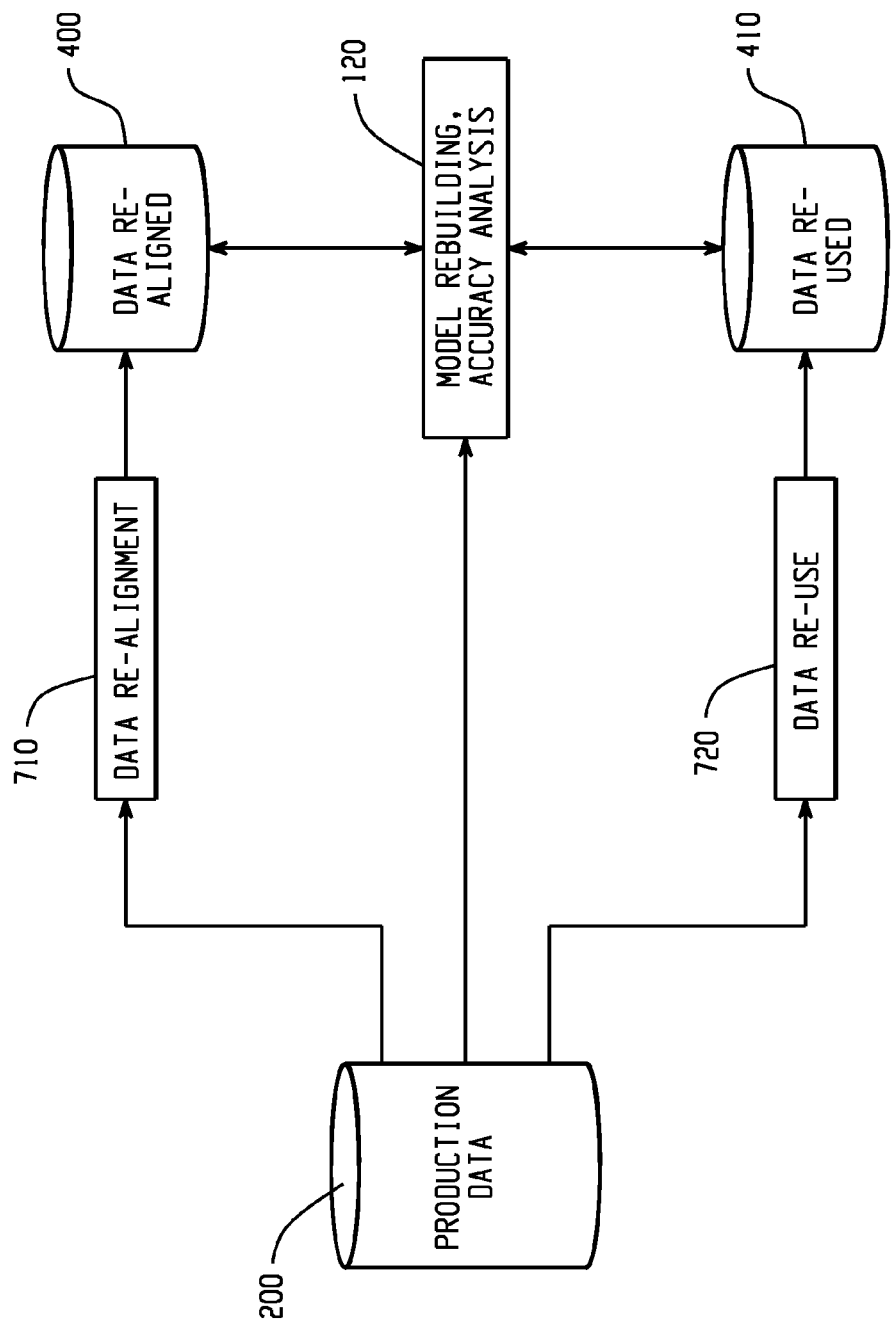
FIG. 8 is a block diagram depicting use of data re-alignment and data re-use in model rebuilding and accuracy analysis.

FIG. 8 illustrates a model rebuilding/building mode and use of the hold out method described above. In the model rebuilding/building mode, a user explores different kinds of model specifications and selects the best model for forecasting. To avoid possible over-fitting, the hold out method described above is used, that is, some portion of the historical data (e.g., most recent history) is held out while the remaining data is used for model building, and the accuracy for the model is calculated against the held out data, which is not used for model training. To better integrate with the accuracy mode or for use without the accuracy mode, data re-alignment and/or data re-use processing (710 and 720) is used.

Figure 9:
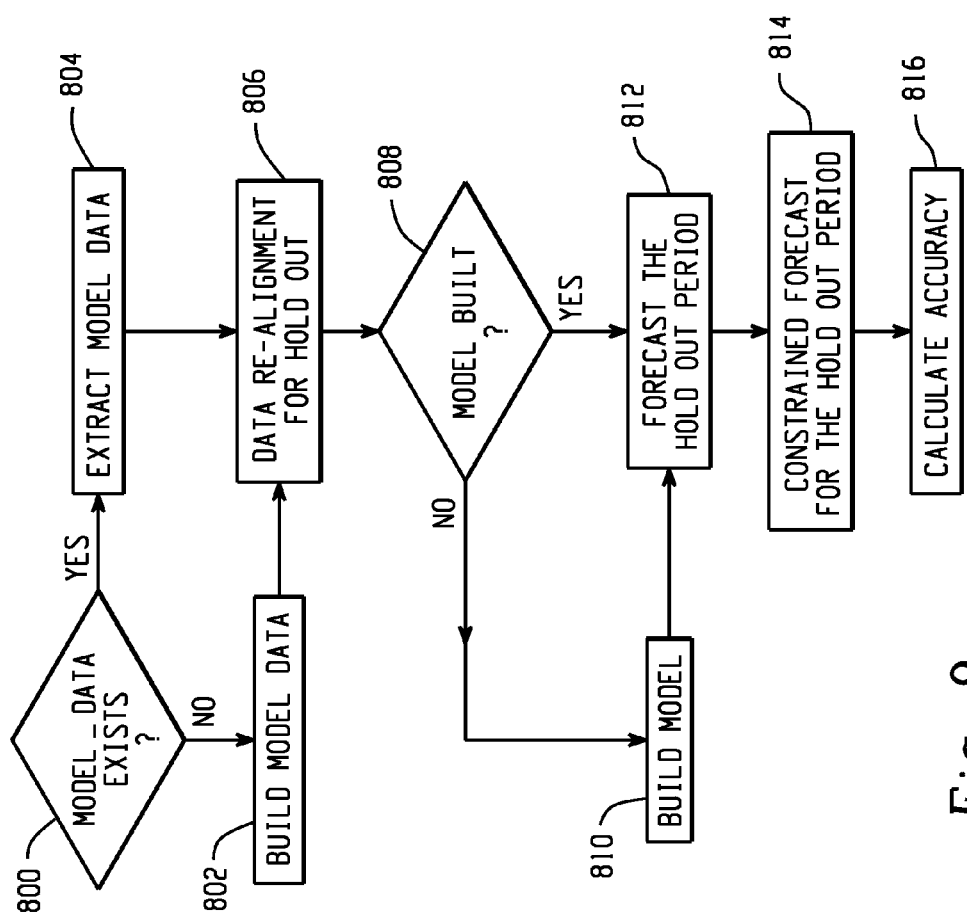
FIG. 9 is a flowchart depicting a hold out method for use in forecast accuracy determinations.

With respect to data re-alignment processing 710, while accuracy monitoring requires the actual week for the future forecasting, a hold out method as shown in FIG. 9 holds out the most recent history (to be regarded as the future) for testing the accuracy of a model being constructed. First, decision process 800 examines whether model data exists in order to build a model. If model data does not exist, then process 802 builds the model data based upon the production data before processing continues at process 806. However if model data does exist as determined by decision process 800, then process 804 extracts the model data from storage.

Process 806 then performs a realignment of the data in order to create a hold out period for later use in determining the accuracy of a constructed model. Process 808 examines whether a model has already been built by the user. If a model has not already been built, then process 810 facilitates the construction of a model. However if a model has already been built as determined by decision process 808, then process 812 uses the model in order to forecast the hold out period. Process 814 constrains the forecast by the available inventory on-hand for the hold out period in order to keep the sales forecasts inline with actual sales that could be constrained by the inventory availability. The accuracy of the forecast with respect to the hold out period is then used to calculate the model forecast accuracy at process 816.

As illustrated in the operational scenario of FIG. 9, the model building process is structured so as to not to interfere with accuracy monitoring. For example, the time sensitive data is re-aligned at process 806 so that the data can be used by process 810 for model building as well as for accuracy monitoring. A separate directory can be created and reserved for the data that is re-aligned. With this data re-alignment, the hold out method will first look up the data in the re-alignment directory. If the data exists in the re-alignment directory, it uses the data from the directory; otherwise, it uses the original data mart for accuracy monitoring.

As an illustration, suppose that when a user wants to try different model specifications and compare these models with existing models, the user wants to see how these proposed models forecast in the future. Because the user cannot wait for the future to occur to assess the accuracy of these models, the sample hold out method is used. In this example, the "current" time is assumed to be sometime in the past, such as one month ago. That is, the most recent weeks of data are excluded (in this example, four weeks) from the model building system, the model is estimated, and then it is forecasted into the "future." Because the "future" has already happened, the user can compare forecasted data (e.g., forecasted sales) to actual data (e.g., actual sales) in order to assess the forecasting accuracy.

When forecasting into the "future," the user can also use the actual marketing mixes implemented by the retailer as these have already been observed. This maneuvering of time involves a re-alignment of the data—a re-alignment which ultimately leaves the original production data mart in its production state. To ensure the original production data mart is preserved, a separate directory can be created and reserved for the data that need to be re-aligned. Only the data that is related to time-based partitions needs be re-aligned. For example, data is re-aligned so that the entries in the hold out period will be regarded as the future for the model. With this data re-alignment, the hold out method will first look up the data in the re-alignment directory. If the data did not need to be realigned and thus, are not in this re-alignment directory, they will be read directly from the original data mart.

With respect to data re-use operations 720 on FIG. 8, data re-alignment 710 can be configured to re-use as much data from the original data mart, that is, all data that does not need re-alignment can stay in the original data mart. The system also tries to re-use model data if possible. Model data contains all the necessary information for building models. It is preprocessed by merging information from different sources. The system allows the user to specify where the model data is stored. If the requested model data already exists, it will use the model data without rebuilding it. Such model data can be re-used for building different models and forecasting different hold out periods. In other words, any data that does not require re-alignment is used directly from the original data mart.

The system can introduce another separate directory which is reserved for storing model data. If the requested model data already exists, the system will use that portion of the already constructed data that it needs—thereby, saving significant time in the assessment process. The portion of model data that is used by the system depends on the hold out period specified and the particular model specification.

FIG. 10 depicts at 900 an example of forecast accuracy results. The output of FIG. 10 shows forecasts of a product (column PROD_HIER_SK) at different stores (column GEO_HIER_SK). The forecasted values (column FORECAST) are compared with the actual values (column ACTUAL) and its accuracy is analyzed with MAPE (mean absolute percentage errors) and RMSE (root mean square error) statistical measures (e.g., columns MAPE and RMSE). It is noted that a system and method can be configured as disclosed herein to be scalable so that it can generate such output results for massive retail data with data re-alignment and data re-use.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the accuracy monitoring process and the hold out process can be configured in many different ways such as shown respectively in FIGS. 11 and 12.

Figure 11:
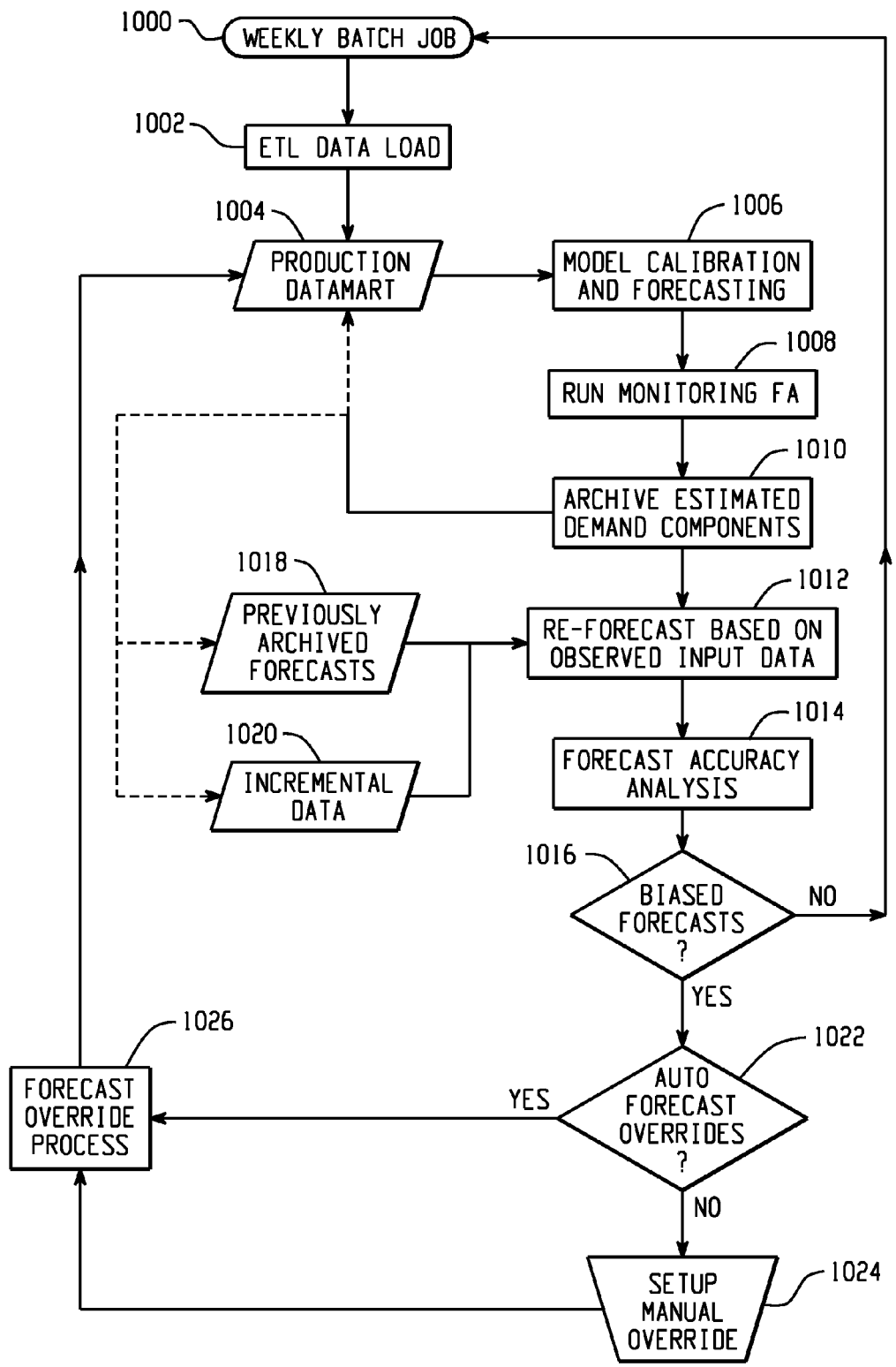
FIG. 11 is a flowchart depicting an accuracy monitoring operational scenario.

FIG. 11 depicts an operational scenario for accuracy monitoring. In this operational scenario, an extract, transformation, and load data operation 1002 is performed upon a weekly batch job 1000. The weekly batch job 1000 contains data to be loaded into the production data mart 1004. Model calibration and forecasting 1006 are performed with the data that is contained within the production data mart 1004. The accuracy monitoring process 1008 analyzes the results of the model forecasting generated by process 1006. The estimated demand components are archived by process 110 in the production data mart 1004 for future use, such as for future accuracy analysis.

A re-forecast 1012 is done based on the observed input data (e.g., previously archived forecasts 1018, incremental data 1020, etc.). Forecast accuracy analysis 1014 is then performed upon these forecasts. If the forecasts are not biased as determined by decision process 1016 through the forecast accuracy analysis, then processing resumes to process a new batch job at 1000. However if bias is detected in the forecasts, then there is a determination at decision process 1022 as to whether manual intervention is required. If manual intervention is not required, then the forecast override process 1026 is performed, and its results are stored in the production data mart 1004. However if there is to be manual override, then a user intervenes at 1024 before the forecast override process is performed so that the user can himself or herself inspect the accuracy results.

Figure 12:
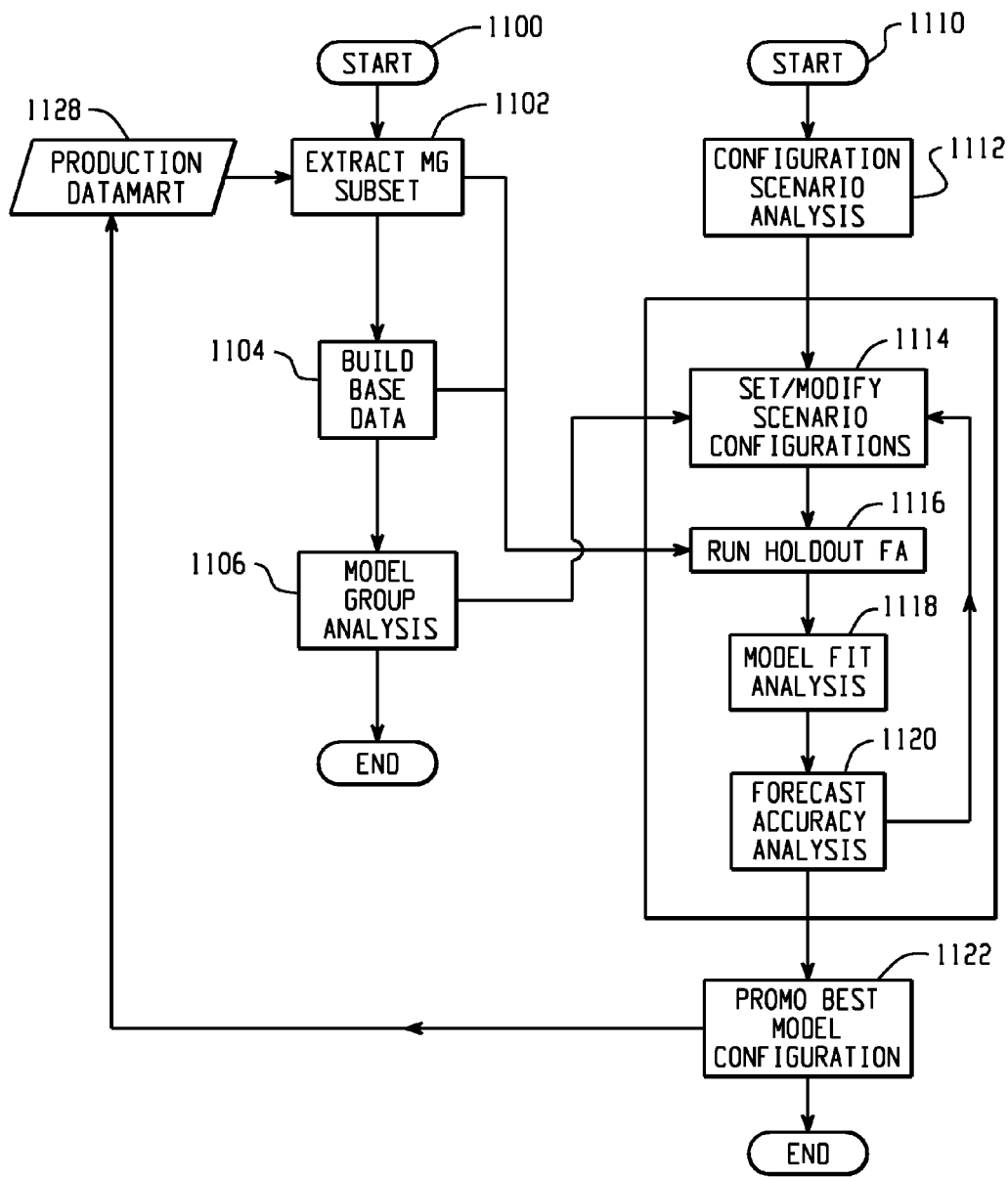
FIG. 12 is a flowchart depicting an operational scenario involving a hold out procedure.

FIG. 12 depicts an operational scenario for a hold out process. In this operational scenario, a model group (MG) subset 1102 is extracted from the production data mart 1128 so that a base set of data can be built by process 1104 for model group analysis 1106.

Through use of this data, model configuration scenario analysis 1112 can be performed in order to explore and select the best model specification(s). After the model scenario configurations are set or modified at process 1114, the hold out method 1116 is then performed using the extracted model group data subset from process 1102 and the base data from process 1104. The model fit results are analyzed by process 1118 and the forecast accuracy results are analyzed by process 1120, and are used as the basis for selecting at 1122 the best performing model for forecasting.

As another example of the wide scope of the systems and methods disclosed herein, a system and method can be configured as disclosed herein to satisfy the following requirements: (1) accuracy monitoring should not be interfered with by model rebuilding, even though model rebuilding may require changing the data mart; and (2) the forecasting accuracy for the model rebuilding should be done in a consistent way with the accuracy monitoring.

Figure 13:
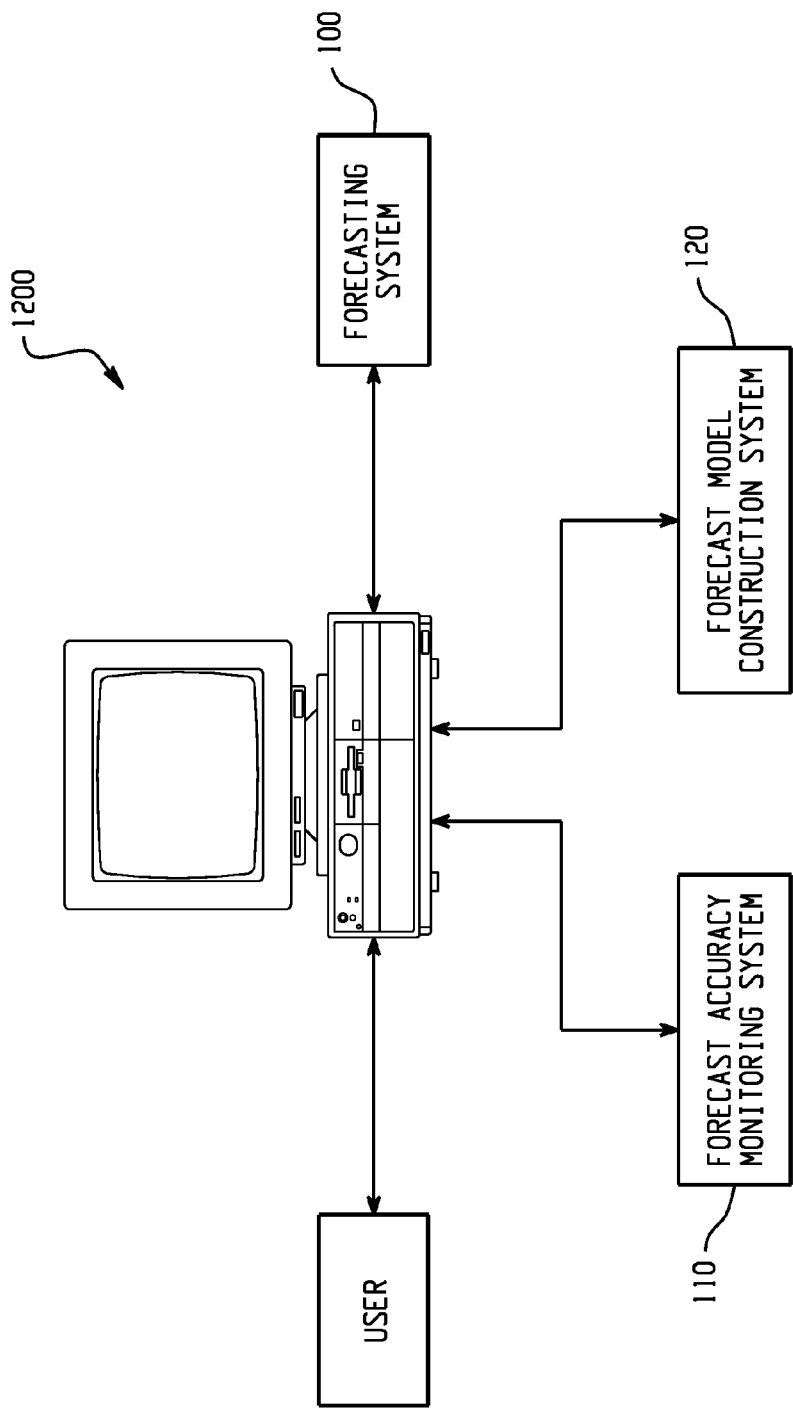
FIG. 13 is a block diagram depicting a single general purpose computer environment wherein a user can interact with a set of forecasting-related systems (e.g., forecasting-related computer programs or software).

It is further noted that the systems and methods may be implemented on various types of computer architectures, such as for example on a single general purpose computer or workstation (as depicted at 1200 in FIG. 13), or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for analyzing forecasting model accuracy, comprising:
    generating a baseline forecast, wherein generating the baseline forecast is performed using a forecasting model and one or more processors;
    receiving an input that specifies a storage time duration;
    storing the baseline forecast, wherein the baseline forecast is stored throughout a time period that lasts for the specified storage time duration;
    receiving marketing mix data associated with promotions of one or more retail products, wherein the promotions occur during the time period, and wherein the marketing mix data includes a price of the one or more retail products during the time period;
    retrieving the baseline forecast subsequent to storing the baseline forecast throughout the time period;
    generating a revised sales forecast using the baseline forecast and the marketing mix data, wherein the revised forecast provides forecasted sales of the one or more retail products during the time period;
    comparing the forecasted sales to a pool of production data, wherein the pool of production data includes sales data that represents actual sales of the one or more retail products during the time period;
    determining an accuracy metric for the forecasting model based on the comparison of the revised sales forecast to the pool of production data;
    receiving an accuracy criteria corresponding to the accuracy metric;
    determining, using one or more data processors, that the accuracy metric fails to satisfy the accuracy criteria, wherein determining includes providing an indication that the accuracy metric fails to satisfy the accuracy criteria;
    copying data from the pool of production data, wherein the data is copied to a separate data store, and wherein copying is performed in response to determining that the accuracy metric fails to satisfy the accuracy criteria;
    designating a first portion of the data copied to the separate data store, wherein the first portion is designated as a training data sample;
    designating a second portion of the data copied to the separate data store, wherein the second portion is designated as an accuracy testing data sample, wherein the data in the training data sample is from an earlier period than the data in the accuracy testing data sample;
    rebuilding the forecasting model, wherein the forecasting model is rebuilt based on the training data sample;
    evaluating forecasting performance of the rebuilt forecasting model, wherein evaluating is performed based on the accuracy testing data sample and includes representing the forecasting performance by generating a rebuilt model accuracy metric; and
    generating an additional forecast, wherein the additional forecast is generated using the rebuilt forecasting model.

2. The method of claim 1, wherein the pool of production data includes retail data from multiple stores.

3. The method of claim 2, further comprising:
receiving a rebuilt model accuracy criteria corresponding to the rebuilt model accuracy metric;
determining that the rebuilt model accuracy metric satisfies the rebuilt model accuracy criteria,
and wherein the additional forecast is generated in response to determining that the rebuilt model satisfies the rebuilt model accuracy criteria.
wherein forecasting model accuracy is monitored on a weekly basis.

4. The method of claim 3, wherein the forecasting model provides a marketing mix effect estimate and a demand prediction for one or more retail products based upon the pool of production data.

5. The method of claim 1, wherein the pool of production data is a single data mart.

6. The method of claim 5, wherein the pool of production data is included within a single data mart, and wherein use of the single data mart obviates maintenance of separate data marts for forecast accuracy monitoring and forecast model construction.

7. The method of claim 1, wherein copying the data from the pool of production data to the separate data store ensures that original production data is preserved.

8. The method of claim 3, wherein the accuracy metric and the rebuilt model accuracy metric are statistical measures used to assess accuracy of forecasting models.

9. The method of claim 8, wherein the statistical measures are a MAPE (mean absolute percentage errors) or RMSE (root mean square error) statistical measure.

10. A system for analyzing forecasting model accuracy, comprising:
one or more data processors;
one or more computer-readable storage mediums containing instructions configured to cause the one or more processors to perform operations including:
generating a baseline forecast, wherein generating the baseline forecast is performed using a forecasting model and one or more processors;
receiving an input that specifies a storage time duration;
storing the baseline forecast, wherein the baseline forecast is stored throughout a time period that lasts for the specified storage time duration;
receiving marketing mix data associated with promotions of one or more retail products, wherein the promotions occur during the time period, and wherein the marketing mix data includes a price of the one or more retail products during the time period;
retrieving the baseline forecast subsequent to storing the baseline forecast throughout the time period;
generating a revised sales forecast using the baseline forecast and the marketing mix data, wherein the revised forecast provides forecasted sales of the one or more retail products during the time period;
comparing the forecasted sales to a pool of production data, wherein the pool of production data includes sales data that represents actual sales of the one or more retail products during the time period;
determining an accuracy metric for the forecasting model based on the comparison of the revised sales forecast to the pool of production data;
receiving an accuracy criteria corresponding to the accuracy metric;
determining, using one or more data processors, that the accuracy metric fails to satisfy the accuracy criteria, wherein determining includes providing an indication that the accuracy metric fails to satisfy the accuracy criteria;
copying data from the pool of production data, wherein the data is copied to a separate data store, and wherein copying is performed in response to determining that the accuracy metric fails to satisfy the accuracy criteria;
designating a first portion of the data copied to the separate data store, wherein the first portion is designated as a training data sample;
designating a second portion of the data copied to the separate data store, wherein the second portion is designated as an accuracy testing data sample, wherein the data in the training data sample is from an earlier period than the data in the accuracy testing data sample;
rebuilding the forecasting model, wherein the forecasting model is rebuilt based on the training data sample;
evaluating forecasting performance of the rebuilt forecasting model, wherein evaluating is performed based on the accuracy testing data sample and includes representing the forecasting performance by generating a rebuilt model accuracy metric; and
generating an additional forecast, wherein the additional forecast is generated using the rebuilt forecasting model.

11. The system of claim 10, wherein the pool of production data includes retail data from multiple stores.

12. The system of claim 11, wherein the operations further include:
receiving a rebuilt model accuracy criteria corresponding to the rebuilt model accuracy metric;
determining that the rebuilt model accuracy metric satisfies the rebuilt model accuracy criteria,
and wherein the additional forecast is generated in response to determining that the rebuilt model satisfies the rebuilt model accuracy criteria.

13. The system of claim 12, wherein the forecasting model provides a marketing mix effect estimate and a demand prediction for one or more retail products based upon the pool of production data.

14. The system of claim 10, wherein the pool of production data is a single data mart.

15. The system of claim 14, wherein the pool of production data is included within a single data mart, and wherein use of the single data mart obviates maintenance of separate data marts for forecast accuracy monitoring and forecast model construction.

16. The system of claim 10, wherein copying the data from the pool of production data to the separate data store ensures that original production data is preserved.

17. The system of claim 12, wherein the accuracy metric and the rebuilt model accuracy metric are statistical measures used to assess accuracy of forecasting models.

18. The system of claim 17, wherein the statistical measures are a MAPE (mean absolute percentage errors) or RMSE (root mean square error) statistical measure.

19. A computer-program product for analyzing forecasting model accuracy, tangibly embodied in a machine-readable storage medium, including instructions configured to cause a data processing apparatus to perform operations including:
generating a baseline forecast, wherein generating the baseline forecast is performed using a forecasting model and one or more processors;
receiving an input that specifies a storage time duration;
storing the baseline forecast, wherein the baseline forecast is stored throughout a time period that lasts for the specified storage time duration;

receiving marketing mix data associated with promotions of one or more retail products, wherein the promotions occur during the time period, and wherein the marketing mix data includes a price of the one or more retail products during the time period;

retrieving the baseline forecast subsequent to storing the baseline forecast throughout the time period;

generating a revised sales forecast using the baseline forecast and the marketing mix data, wherein the revised forecast provides forecasted sales of the one or more retail products during the time period;

comparing the forecasted sales to a pool of production data, wherein the pool of production data includes sales data that represents actual sales of the one or more retail products during the time period;

determining an accuracy metric for the forecasting model based on the comparison of the revised sales forecast to the pool of production data;

receiving an accuracy criteria corresponding to the accuracy metric;

determining, using one or more data processors, that the accuracy metric fails to satisfy the accuracy criteria, wherein determining includes providing an indication that the accuracy metric fails to satisfy the accuracy criteria;

copying data from the pool of production data, wherein the data is copied to a separate data store, and wherein copying is performed in response to determining that the accuracy metric fails to satisfy the accuracy criteria;

designating a first portion of the data copied to the separate data store, wherein the first portion is designated as a training data sample;

designating a second portion of the data copied to the separate data store, wherein the second portion is designated as an accuracy testing data sample, wherein the data in the training data sample is from an earlier period than the data in the accuracy testing data sample;

rebuilding the forecasting model, wherein the forecasting model is rebuilt based on the training data sample;

evaluating forecasting performance of the rebuilt forecasting model, wherein evaluating is performed based on the accuracy testing data sample and includes representing the forecasting performance by generating a rebuilt model accuracy metric; and generating an additional forecast, wherein the additional forecast is generated using the rebuilt forecasting model.

20. The computer-program product of claim 19, wherein the pool of production data includes retail data from multiple stores.

21. The computer-program product of claim 20, wherein the operations further include:

receiving a rebuilt model accuracy criteria corresponding to the rebuilt model accuracy metric;

determining that the rebuilt model accuracy metric satisfies the rebuilt model accuracy criteria, and wherein the additional forecast is generated in response to determining that the rebuilt model satisfies the rebuilt model accuracy criteria.

22. The computer-program product of claim 21, wherein the forecasting model provides a marketing mix effect estimate and a demand prediction for one or more retail products based upon the pool of production data.

23. The computer-program product of claim 19, wherein the pool of production data is a single data mart.

24. The computer-program product of claim 23, wherein the pool of production data is included within a single data mart, and wherein use of the single data mart obviates maintenance of separate data marts for forecast accuracy monitoring and forecast model construction.

25. The computer-program product of claim 19, wherein copying the data from the pool of production data to the separate data store ensures that original production data is preserved.

26. The computer-program product of claim 21, wherein the accuracy metric and the rebuilt model accuracy metric are statistical measures used to assess accuracy of forecasting models.

27. The computer-program product of claim 26, wherein the statistical measures are a MAPE (mean absolute percentage errors) or RMSE (root mean square error) statistical measure.

* * * * *